(12) United States Patent
Pasquarelli et al.

(10) Patent No.: US 12,503,046 B2
(45) Date of Patent: Dec. 23, 2025

(54) VEHICLE PANE WITH A LIGHTING DEVICE

(71) Applicant: Webasto SE, Stockdorf (DE)

(72) Inventors: Robert Pasquarelli, Stockdorf (DE); Georg Rossmair, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/850,676

(22) PCT Filed: Apr. 6, 2023

(86) PCT No.: PCT/EP2023/059287
§ 371 (c)(1),
(2) Date: Sep. 25, 2024

(87) PCT Pub. No.: WO2023/198638
PCT Pub. Date: Oct. 19, 2023

(65) Prior Publication Data
US 2025/0222861 A1 Jul. 10, 2025

(30) Foreign Application Priority Data
Apr. 11, 2022 (DE) .................... 10 2022 108 689.5

(51) Int. Cl.
*F21V 17/00* (2006.01)
*B60Q 3/208* (2017.01)
(Continued)

(52) U.S. Cl.
CPC .............. *B60Q 3/208* (2017.02); *B60Q 3/62* (2017.02); *F21S 8/028* (2013.01); *F21V 17/005* (2013.01);
(Continued)

(58) Field of Classification Search
CPC .. B60Q 3/208; B60Q 3/62; F21S 8/028; F21V 17/005; F21V 2200/20; F21W 2106/00; F21Y 2105/00; F21Y 2115/10
See application file for complete search history.

(56) References Cited

U.S. PATENT DOCUMENTS 10,551,029 B2 * 2/2020 Mercado Peña ........ F21S 43/14
2014/0362597 A1 * 12/2014 Verrat-Debailleul .... B60Q 3/62
362/511
(Continued)

FOREIGN PATENT DOCUMENTS

DE 102014006490 A1 11/2015
DE 102015000071 A1 7/2016
(Continued)

OTHER PUBLICATIONS

Office Action issued in corresponding German Application No. 10 2022 108 689.5; mailed Mar. 30, 2023; In German with English machine translation (6 pages).
(Continued)

*Primary Examiner* — Evan P Dzierzynski
(74) *Attorney, Agent, or Firm* — Fitch, Even, Tabin & Flannery, LLP

(57) ABSTRACT

A vehicle pane with a light guide layer on the pane inner face and a lighting device which introduces light of a light source into the light guide layer by means of a light-coupling device. The light-coupling device has at least one light-coupling element that has a base surface and is optically connected to a light guide layer inner face, which faces the vehicle interior, via the base surface. The light-coupling element may have a light-coupling region which lies opposite the base surface and on which the light source has at least one LED is positioned, said light source emitting light into the light-coupling element via the light-coupling region.

17 Claims, 7 Drawing Sheets

(51) Int. Cl.
  *B60Q 3/62* (2017.01)
  *F21S 8/02* (2006.01)
  *F21W 106/00* (2018.01)
  *F21Y 105/00* (2016.01)
  *F21Y 115/10* (2016.01)

(52) U.S. Cl.
  CPC ...... *F21V 2200/20* (2015.01); *F21W 2106/00* (2018.01); *F21Y 2105/00* (2013.01); *F21Y 2115/10* (2016.08)

(56) References Cited

U.S. PATENT DOCUMENTS

| | | | | |
|---|---|---|---|---|
| 2015/0078020 | A1* | 3/2015 | Verrat | B60Q 1/268 362/509 |
| 2018/0001751 | A1* | 1/2018 | Thannheimer | G02B 6/0046 |
| 2018/0079353 | A1* | 3/2018 | Litke | B60Q 1/52 |
| 2019/0106053 | A1 | 4/2019 | Chen | |
| 2020/0241189 | A1 | 7/2020 | Schabacker | |
| 2021/0061163 | A1 | 3/2021 | Black | |
| 2021/0170724 | A1* | 6/2021 | Hennion | B32B 17/10541 |
| 2023/0118480 | A1 | 4/2023 | Pasquarelli | |

FOREIGN PATENT DOCUMENTS

| | | |
|---|---|---|
| DE | 202018105785 U1 | 11/2018 |
| DE | 102020101813 A1 | 7/2020 |
| DE | 102020109338 B3 | 4/2023 |
| EP | 0856615 A2 | 8/1998 |
| WO | 2023031460 A1 | 3/2023 |

OTHER PUBLICATIONS

ISR issued in corresponding PCT/EP2023/059287; mailed Jun. 15, 2023; In German and English (16 pages).

* cited by examiner

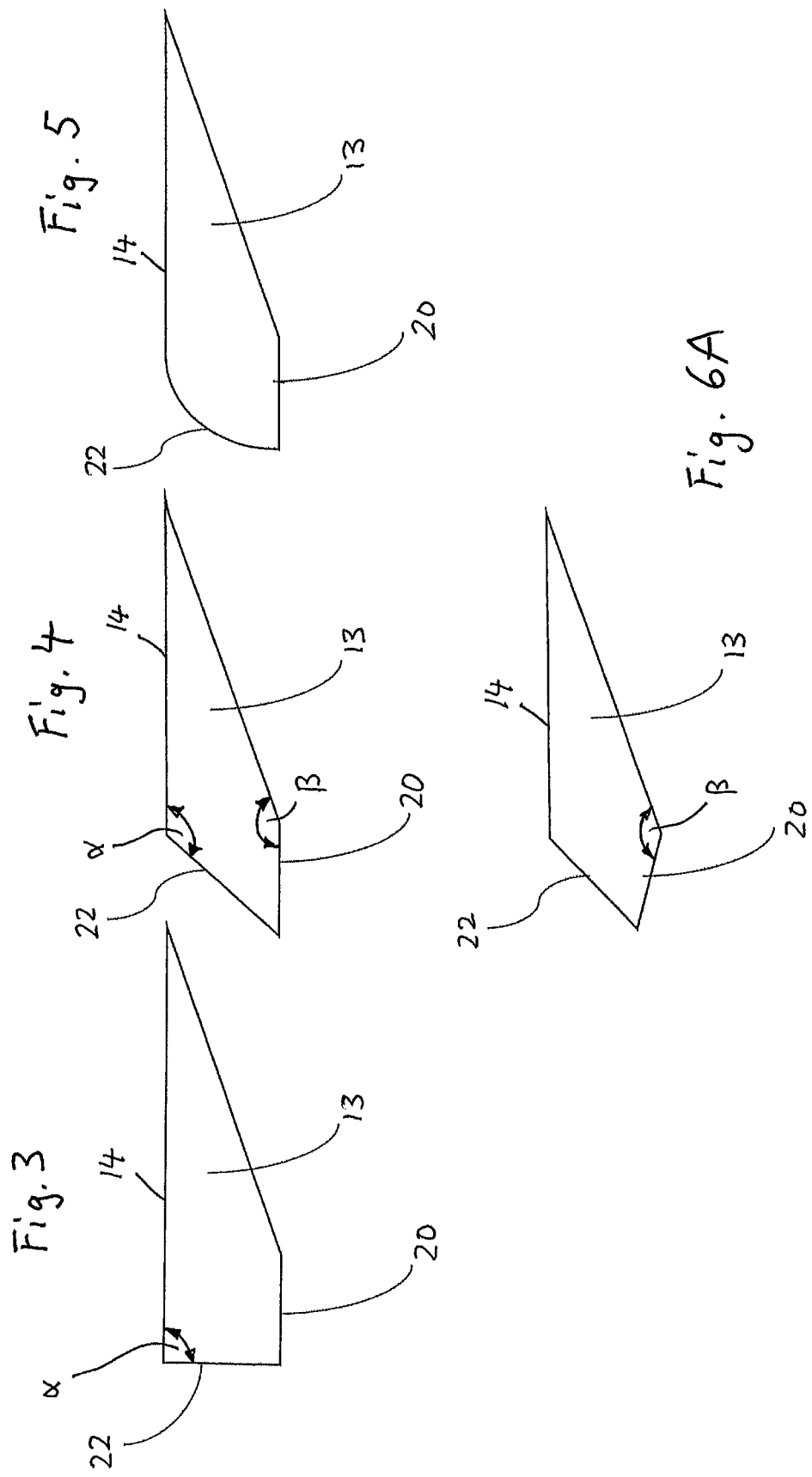

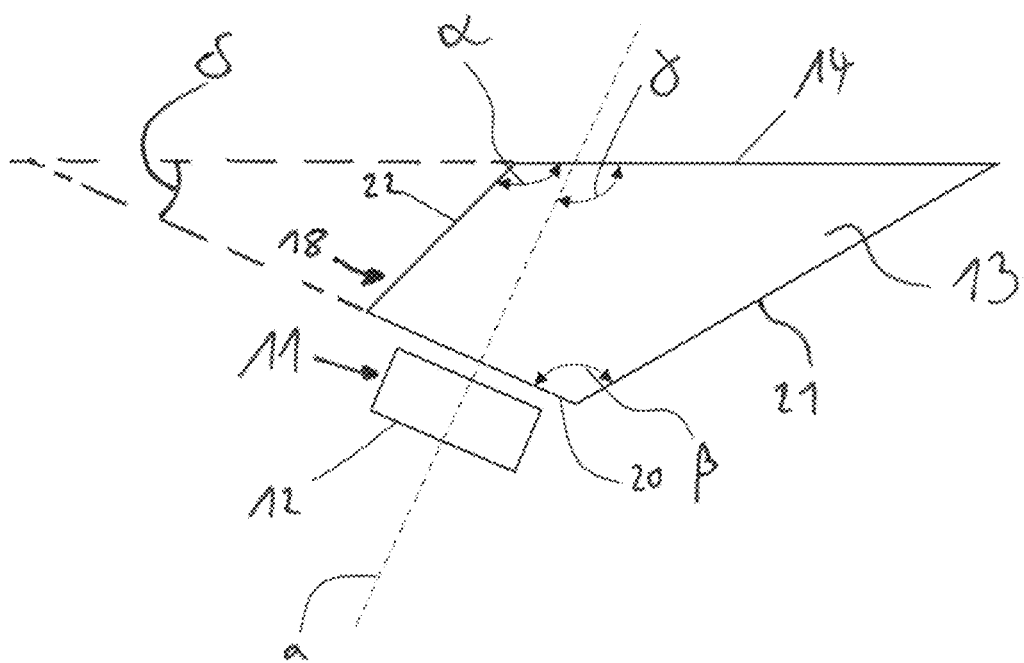

VEHICLE PANE WITH A LIGHTING DEVICE

CROSS-REFERENCE TO RELATED APPLICATIONS

This application is a U.S. national phase application filed under 35 U.S.C. § 371 of International Application No. PCT/EP2023/059287, filed on Apr. 6, 2023, published under WO 2023/198683 A1 on Oct. 19, 2023, designating the United States, which claims priority from German Patent Application Number 10 2022 108 689.5, filed on Apr. 11, 2022, which are hereby incorporated herein by reference in their entirety.

FIELD

A vehicle pane having a light guide layer on the pane inner side and having a lighting device, which introduces light from a light source into the light guide layer by means of a light incoupling device, the light incoupling device having at least one light incoupling element which has a base surface and is optically connected, via its base surface, to an inner surface of the light guide layer facing a vehicle interior.

BACKGROUND

DE 10 2020 109 338 B3 has disclosed a vehicle pane of the generic type. A lighting device of the vehicle pane has a light source, which is arranged on an end side of an elongate rod-shaped light guide made, for example, of PMMA or PC. The lighting device further comprises a strip-type light incoupling element with a body that is wedge-shaped in cross section. The light incoupling element, which is made of a plastics material such as PMMA, and the light guide extend over the length of the lighting device, wherein the light guide is arranged directly in front of a lateral elongate end face of the light incoupling element. This arrangement of the light guide means that the lighting device has a larger width in the transverse direction of the vehicle pane, as a result of which the see-through region of the vehicle pane is reduced.

Further prior art is constituted by DE 10 2014 006 490 A1 and DE 20 2018 105 785 U1.

SUMMARY

The present embodiments are based on the object of providing a vehicle pane mentioned in the introduction which is improved with regard to the lighting device. This object is achieved by a vehicle pane according to the invention as claimed in claim 1. Further advantageous developments and configurations of the invention are evident from the dependent claims.

The vehicle pane mentioned in the introduction is advantageously developed according to the invention in such a way that the light incoupling element has a light incoupling region which is situated opposite the base surface and on which is positioned the light source having at least one LED, in particular a top LED, which radiates light into the light incoupling element via the light incoupling region. Such a light incoupling region is formed for example by a light incoupling surface which is situated opposite the base surface and thus constitutes a surface of the light incoupling element which faces away in relation to the base surface and which is not perpendicular or at a right angle to the base surface.

In the case of the vehicle pane according to the invention, therefore, on account of the positioning of the light source with the at least one LED on the underside of the light incoupling element, the lighting device is formed so as to be narrower in comparison with the lighting device of the known vehicle pane mentioned in the introduction.

The lighting device can be provided with just a single elongate strip-type light incoupling element extending over the length of the lighting device. On the other hand, the lighting device can also have a plurality of light incoupling elements of identical type which extend one behind another in the longitudinal direction of the lighting device along a line inward with respect to a lateral pane edge. Each light incoupling element is expediently formed so as to be substantially wedge-shaped in cross-section, as an optical prism. The arrangement of a plurality of individual light incoupling elements enables an improved adaptation to a curvature of the vehicle pane in the longitudinal direction or in the direction of the longitudinally extending lighting device. The light incoupling element can be made of glass or a plastics material such as e.g. PMMA, PC, COP (cyclic olefin polymer) or COC (cyclic olefin copolymer).

In accordance with an alternative embodiment, provision can be made for each light incoupling element to be formed in one piece with the light guide layer. The base surface thus corresponds to the inner surface of the light guide layer in the place of the light incoupling element, but without a molded-on light incoupling element. A light guide layer made of clear glass thus contains the at least one light incoupling element molded on from the same glass material during production. A light guide layer which is made of a plastics material, in particular as specified above regarding the light incoupling elements, contains the molded-on or injection-molded-on light incoupling elements made of the same plastics material or a plastics material with a light refraction index that is the same as or similar to that of the light guide layer. Owing to this one-piece or integrated formation of the light incoupling elements with the light guide layer, an otherwise necessary coupling or securing of the at least one light incoupling element to the light guide layer is dispensed with.

One preferred embodiment provides for each light incoupling element to be secured as an independent component to the light guide layer. Such securing is expediently effected by means of adhesive bonding, e.g. by means of an adhesive tape or an adhesive layer. A pressure-sensitive adhesive, an optically clear liquid adhesive, EVA, PVB, TPU, an epoxy adhesive or an acrylate adhesive can be used as the material for an adhesive bond.

The vehicle pane is expediently formed in such a way that it has an outer pane and an inner pane, e.g. a clear glass pane, connected to the outer pane by means of a connecting layer, such as e.g. a hot melt adhesive film. Expediently, the inner pane forms the light guide layer. However, the light guide layer can also be formed by another layer, such as e.g. a film or the like.

Expediently, the inner pane includes a structure that protrudes optically when light radiates into the inner pane. The structure is produced, for example, by screen printing or printing on the inner pane. For example, the structure can represent a pattern, emblem, or lettering, or combinations thereof.

Preferably, a plurality of LEDs are arranged on the light incoupling element at a distance from one another in a series. The LEDs can be connected to one another via an LED strip.

It is particularly preferred to provide a carrier plate on which the at least one LED is attached. The carrier plate is preferably a PCB (printed circuit board). The carrier plate is arranged on the underside of the light incoupling element situated opposite the base surface, preferably in an orientation parallel to the base surface of the light incoupling element. The LEDs are arranged on the top side of the carrier plate facing the light incoupling element. In the embodiment as a top LED, each LED emits its light upward to the light incoupling region of the light incoupling element. The power supply of the LEDs and the control thereof take place via the carrier plate or PCB.

Preferably, each LED is connected to the light incoupling region via a light guide optics unit. The light guide optics unit allows the light emitted by the LED to be influenced and steered with regard to optimized radiation of light into the light incoupling element and with subsequent reflection in the light incoupling element in the direction of the light guide layer of the vehicle pane.

In accordance with one embodiment, the light guide optics unit is formed on the light incoupling region of the light incoupling element e.g. is molded on during the injection molding of the light incoupling element. On the other hand, the light guide optics unit can also be positioned as an independent optics component between the light incoupling region of the light incoupling element and the LED. Expediently, the light guide optics unit is arranged on the LED or a housing of the LED and is thus positioned correctly at the light incoupling region by means of the carrier plate.

Preferably, the light incoupling element is formed with a plane light incoupling surface at its light incoupling region. The plane light incoupling surface can be oriented parallel or approximately parallel to the base surface. On the other hand, the light incoupling surface can also be oriented or arranged non-parallel, for example at an acute angle, with respect to the base surface. In particular, it can be arranged in an inclined manner such that an LED arranged thereon radiates its light with a central light ray further inward in the direction of the center of the vehicle pane.

In the case in which the light incoupling region is formed with a plane light incoupling surface which is oriented non-parallel to the base surface, that should be understood to mean orientations of the light incoupling surface for which the light incoupling surface is at least situated opposite the base surface, and preferably is at an acute angle with respect to the base surface, i.e. is not perpendicular to the base surface. In other words, the light incoupling surface faces away from the base surface.

In one embodiment, the light incoupling surface is arranged relative to the base surface at an angle in the range of 50° to 89°, preferably in a range of 70° to 87°, in particular in a range of 75° to 85°. Consequently, light from the light source embodied as an LED can be incoupled into the light guide layer via the light incoupling element predominantly at an angle corresponding to total internal reflection within the light guide layer and such that light incoupled into the light guide layer is guided within the light guide layer by means of total internal reflection.

If the plane light incoupling surface is oriented parallel to the base surface, the advantage of simple mounting and orientation of the light source is afforded precisely on account of the parallel orientation; particularly if the LED is embodied as a top LED and is arranged on a carrier plate, preferably a PCB carrier plate. Moreover, with the parallel orientation of the light incoupling surface with respect to the base surface, it is possible to comply with smaller tolerances with regard to the overall system comprising light source, light incoupling element and light guide layer. In addition, the overall system comprising carrier plate, light source, light incoupling element and light guide layer can turn out to have a smaller installation depth compared with the case in which the light incoupling surface is not oriented parallel but rather at an angle with respect to the base surface.

Expediently, the light incoupling element contains a depression in its light incoupling region. The LED or the light guide optics unit is at least partly inserted into the depression. Moreover, the light guide optics unit can be formed in the light incoupling region formed in the depression. The light guide optics unit is then formed in a manner set back into the interior of the light incoupling element. The depression expediently serves for the correct assignment and positioning of the LED with respect to the light incoupling region by virtue of the fact that it predefines such a position of the LED. If the light guide optics unit is molded on or in the light incoupling region, a mounting process for attaching an independent light guide optics unit or such an optics component can be obviated, in principle. Furthermore, provision can be made for the light guide optics unit to comprise a TIR collimator or total internal reflection collimator. By means of such a TIR collimator, the light from the LED can be radiated as a focused parallel light beam into the light incoupling element. The radiation of light into the light incoupling element and the further reflection into the light guide layer can thus be optimized.

In accordance with one preferred embodiment, provision is made for the light incoupling element to have a lateral boundary surface which is directed to an adjacent pane edge and at which light radiated into the light incoupling element is reflected by total internal reflection in the direction of the light guide layer. The lateral boundary surface, on account of the light reflection provided thereby, affords an increase in the luminosity of the light guide layer.

The boundary surface can contribute to increasing the luminosity in various arrangements and configurations. In this regard, the boundary surface can be formed as a planar reflection surface and can be oriented perpendicularly to the base surface or at an obtuse internal angle with respect to the base surface. On the other hand, the boundary surface can be formed as a curved reflection surface or can have at least one curved portion. A curved boundary surface extends in a manner proceeding from the base surface in the direction of a side edge of the vehicle pane with such curvature downward in the direction of the light incoupling region. The boundary surface accordingly forms a part of the outer side of the light incoupling element or the entire outer side.

In accordance with one preferred embodiment, the light incoupling element has a reflective surface or coating on its boundary surface. The reflection capability of the boundary surface is increased as a result.

In accordance with one preferred embodiment, the carrier plate is positioned and fixed relative to the light incoupling element by means of a mount of the light incoupling element. The mount can constitute the sole securing of the carrier plate or it can be supplemented by a further securing such as e.g. an adhesive bond on a roof component.

Such a mount expediently handlers at least two projections or pins which are arranged at the light incoupling element inward from the LEDs and in particular in each case offset with respect to the LEDs. The pins each have a securing clip or the like, by way of which they engage in an assigned opening in the carrier plate. However, provision can also be made of latching elements or the like for fixing engagement on the carrier plate.

In accordance with a further embodiment, provision is made for the carrier plate to be attached to a cover which covers the light incoupling element. Such a cover, which also constitutes a screen, is fixable e.g. firstly to the vehicle pane and secondly to a roof component or roof frame by adhesive bonding and/or plug connection. The carrier plate can be attached to the cover in particular by way of a mount or by way of an adhesive bond.

In accordance with a further embodiment, the carrier plate can be adhesively bonded to the light incoupling element, e.g. at a wedge reflection surface of the wedge-shaped light incoupling element.

If the carrier plate is held substantially parallel to the inner surface of the light guide layer, then a parallel arrangement of the carrier plate should not be understood in the sense of a strictly mathematical parallelism. Rather, a parallel arrangement of the carrier plate should be understood also to be an arrangement with some inclination relative to the light guide layer, for example at an angle of up to 15° or 20°.

Preferably, the cover is formed with a longitudinal curvature, which is adapted to a curvature of the light guide layer or the vehicle pane and the at least one light incoupling element attached thereto and in particular matches this curvature. If the cover is sufficiently stiff, it can make the carrier plate protrude accordingly when the carrier plate is positioned together with the cover relative to the light incoupling element.

The vehicle pane according to the invention can be any pane of a vehicle glazing, for example a lid arranged fixedly or movably in a roof opening, a glazing of a roof module or panoramic roof, or a side pane, a rear pane, or a front pane.

BRIEF DESCRIPTIONS OF THE DRAWINGS

The embodiments are explained in more detail below with reference to the drawing on the basis of exemplary embodiments of a vehicle pane according to the invention. In the figures:

FIG. 3 shows a cross-sectional view of one embodiment of the light incoupling element;

FIG. 4 shows a cross-sectional view of one embodiment of the light incoupling element;

FIG. 5 shows a cross-sectional view of one embodiment of the light incoupling element;

FIG. 6A shows a cross-sectional view of one embodiment of the light incoupling element;

FIG. 6B shows a cross-sectional view of one embodiment of the light incoupling element;

DETAILED DESCRIPTION

Figure 1:
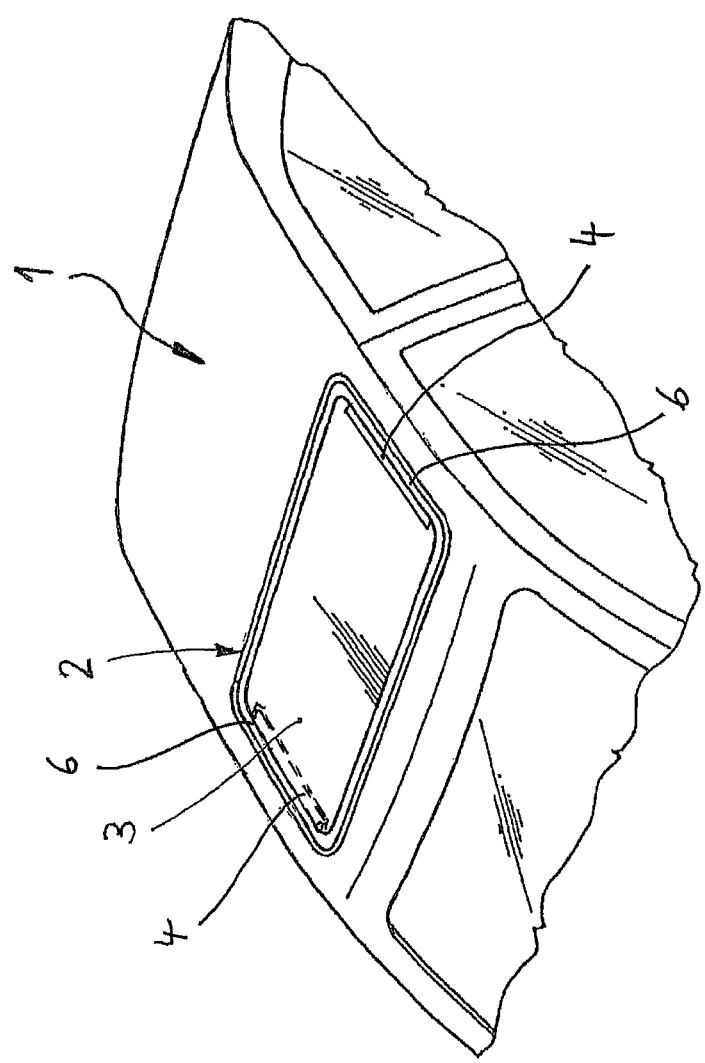
FIG. 1 shows an isometric view of a vehicle roof with a vehicle pane according to the invention.

A vehicle, such as e.g. an automobile, comprises a vehicle roof 1 (FIG. 1) with a roof opening 2, in which is arranged a vehicle pane 3, which, for example, is fixedly arranged in the roof opening 2 or is in the form of a lid, which is mounted movably in the roof opening 2 by means of a mounting device and is adjustable between a closed position and ventilating or open positions in a manner known per se. The vehicle pane 3 may also be a fixed part or portion of a roof module or panoramic roof. The vehicle pane 3 has a respective lighting device 4 which is arranged on the pane inner side 5 and is preferably arranged along a respective side edge 6 of the vehicle pane 3 and inward from the side edge 6.

The vehicle pane 3 comprises (see FIG. 2) an outer pane 7, an inner pane 8, and a connecting layer 9, which connects the outer pane 7 and the inner pane 8 to one another and contains e.g. a laminate layer, laminate film or hot-melt adhesive film. For example, the outer pane 7 is a tinted glass pane. The inner pane 8 is in particular a transparent glass pane or clear glass pane, which forms a light guide layer 10.

The lighting device 4 has a strip-shaped light source 11 having a plurality of LEDs 12 arranged next to one another. An elongate light incoupling element 13 of the lighting device 4 constitutes an optical prism and is, for example, a plastics injection-molded part. The light incoupling element 13 has a base surface 14, via which the light incoupling element 13 is secured to an inner surface 15 of the inner pane 8 or the light guide plate 10 e.g. by means of an adhesive bond 16 (FIG. 2), for example in the form of a transparent adhesive or a transparent adhesive tape. The light incoupling element 13, which is in particular substantially wedge-shaped in cross section, is formed with a wedge vertex 17 directed in a transverse direction with respect to the longitudinal extent of the light incoupling element 13 and inward in the direction of the center of the vehicle pane 3.

The light incoupling element 13 has a light incoupling region 18 situated on the underside 19 of the light incoupling element 13 situated opposite the base surface 14. The light incoupling region 18 is formed with a plane light incoupling surface 20 of the light incoupling element 13, said surface being oriented parallel to the base surface 14, for example. The light incoupling surface 20 expediently adjoins a lower wedge reflection surface 21 inclined with respect to the base surface 14 and extending as far as the wedge vertex 17.

The light incoupling element 13 has a lateral boundary surface 22 on its outer side 24 facing a lateral pane edge 23 of the vehicle pane 3. The lateral boundary surface 22 is e.g. planar and extends from the light incoupling surface 20 as far as the base surface 14 over the entire outer side 24 of the light incoupling element 13. In accordance with the embodiment illustrated in FIG. 2, the lateral boundary surface 22 is arranged in a manner inclined with respect to the base surface 14 and with respect to the light incoupling surface 20, e.g. at an obtuse internal angle α of e.g. 135° with respect to the base surface 14.

The LEDs 12 are fixedly attached on a carrier plate 25. The carrier plate 25 is expediently a PCB (printed circuit board) and configured as a sheetlike strip-shaped component via which the power supply of the LEDs 12 and the control thereof take place. The carrier plate 25 is arranged in its installation position approximately parallel to the pane inner side 5 or to the inner surface 15 of the inner pane 8 and also to the base surface 14 and at a distance therefrom. The LEDs 12 are LEDs that emit light upward, or "top" LEDs, which, therefore, in their position on the carrier plate 25 in which they are situated on the side of the carrier plates 25 facing the light guide layer 10, emit the light perpendicularly from the surface of the carrier plate 25. Alternatively, the LEDs can also have a different emission direction, but can be provided with a corresponding optics unit (not illustrated), such that the main emission direction thereof is directed toward the light incoupling surface 20. Alternatively, it is also possible to use side LEDs with predominantly lateral outcoupling of light, wherein here, too, the main emission direction thereof is directed toward the light incoupling surface 20.

Figure 2:
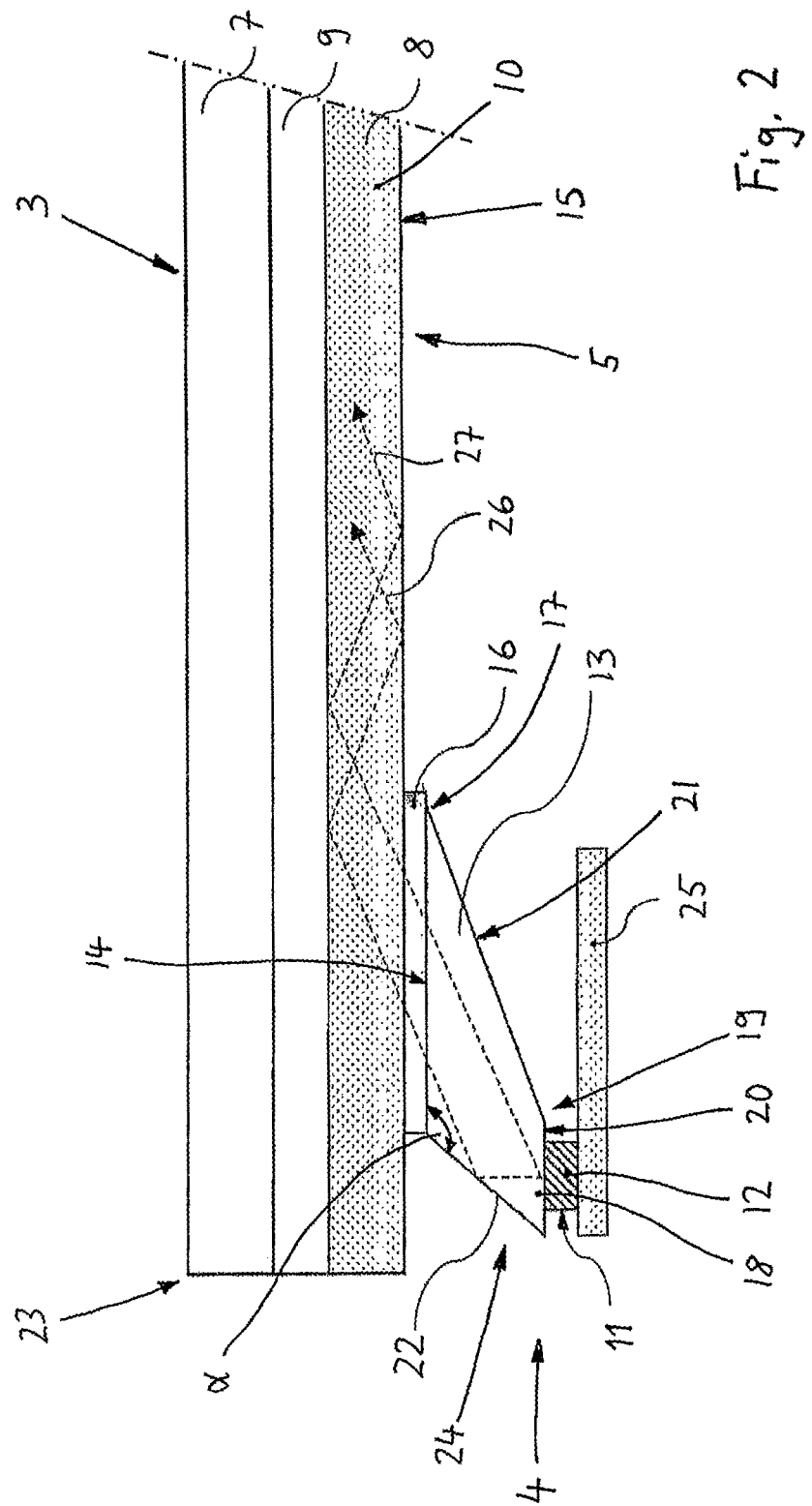
FIG. 2 shows a cross-sectional view of a lateral edge region of the vehicle pane with a lighting device with an LED light source and with a light incoupling element on a light guide layer of the vehicle pane.

The carrier plate 25 is positioned relative to the light incoupling element 13 in such a way that the LEDs 12 are arranged in front of or at the light incoupling surface 20. The LEDs 12 radiate light into the light incoupling element 13 via the light incoupling surface 20. The light is reflected by total internal reflection in particular at the lateral boundary surface 22 and is radiated into the light guide layer 10. FIG. 2 depicts two light beams 26 and 27 representing by way of example the light emitted by the LED 12 within an emission angle of e.g. 120°.

The LEDs 12 are thus arranged on the light incoupling element 13 below the light incoupling region 18 or the light incoupling surface 20. Consequently, the region in front of the outer side 24 of the light incoupling element 13 in the direction of the pane edge 23 is not required for the arrangement of a part of the illumination or of the light source. Accordingly, the width of the lighting device 4 in the transverse direction of the vehicle pane 3 is smaller than in the case of a lighting device as known e.g. from DE 10 2020 109 338 B3, in which the light source is arranged in front of a lateral end face of the light incoupling element directed toward the pane edge. A larger see-through region of the vehicle pane 3 remains as a result of the smaller width of the lighting device 4. The carrier plate 25 extends below the light incoupling element 13 preferably only as far as the outer side 24 of the light incoupling element 13 or only slightly beyond that. This means that the carrier plate 25 also does not increase, or does not significantly increase, the installation space of the lighting device 4 in the width direction thereof or in the transverse direction.

Figure 9:
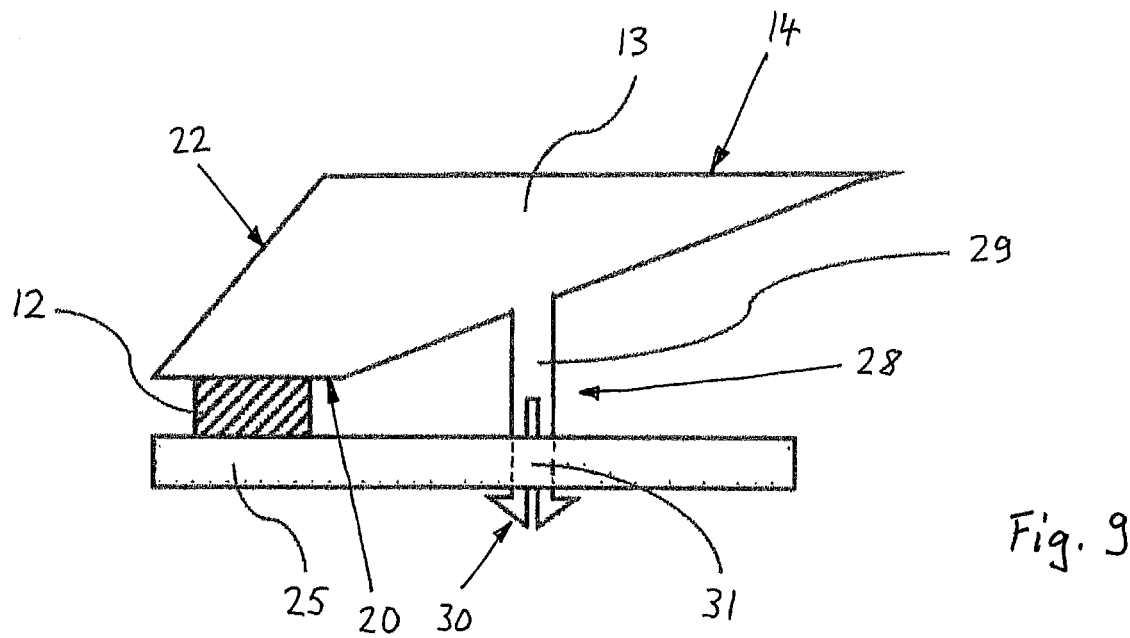
FIG. 9 shows a cross-sectional view of a carrier plate which carries the LED light source and which is secured to the light incoupling element.

The light incoupling element 13 has a mount 28 (FIG. 9), which positions and keeps fixed the carrier plate 25 with the LED 12 relative to the light incoupling element 13 and to the light incoupling surface 20. The carrier plate 25 is preferably embodied as a longitudinally extending strip and preferably has a plurality of LEDs 12. Each LED 12 is preferably assigned a light incoupling element 13 or each light incoupling element 13 is assigned at least one LED 12. The mount 28 contains at least one, preferably a plurality of projections or pins 29 which are attached to the light incoupling element 13, expediently to the wedge reflection surface 21, or are molded thereon during injection molding and project downward beyond the light incoupling element 13 or the light incoupling surface 20 thereof and thus protrude on the opposite side of said element relative to the base surface 14. A securing clip 30 is attached to or molded on each pin 29. The carrier plate 25 has a respective hole or opening 31 assigned to each pin 29. The carrier plate 25 is plugged onto each pin 29. At least one securing clip 30 latches in place on the carrier plate 25 and preferably engages behind the latter at the hole or opening 31. The carrier plate 25 is thus kept fixed by means of the securing clip(s) 30 latched in place on the carrier plate 25. The pins 29 are preferably expediently arranged offset with respect to the LEDs 12 in the longitudinal direction of the light incoupling element 13, such that when observed laterally, a respective pin 29 is arranged between two LEDs 12. Each pin 29 is thus arranged on the wedge reflection surface 21 in a region with relatively low light reflection. In addition, it is also possible to provide at least one pin 29 without securing clip 30 which is assigned to a hole or opening 31 and serves for positioning the carrier plate 25 vis-à-vis the at least one light incoupling element 13.

Figure 10:
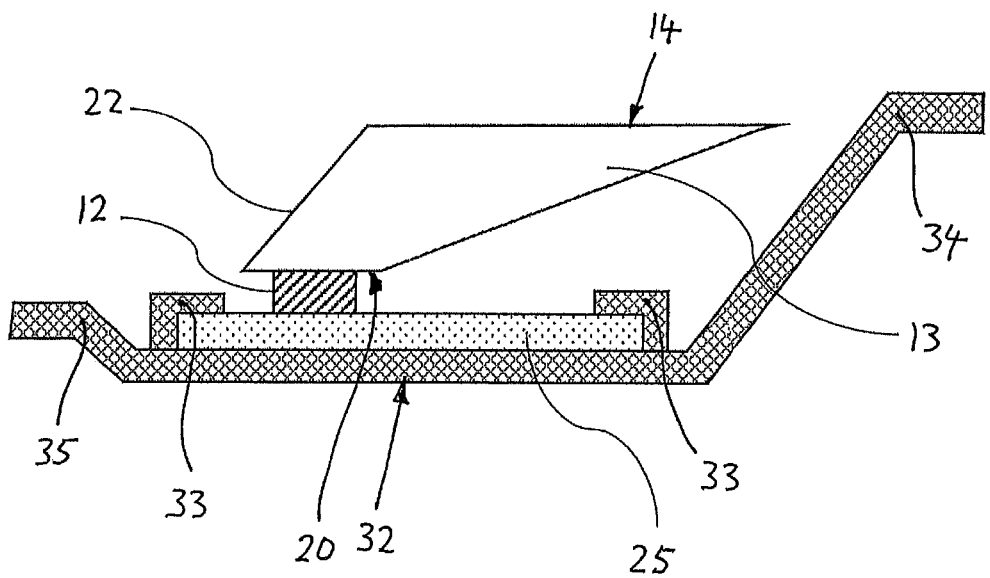
FIG. 10 shows a cross-sectional view of a further embodiment of a mount of the carrier plate which carries the LED light source.

An alternative securing of the carrier plate 25 provides (see FIG. 10) for the carrier plate 25 to be attached to a cover 32. The cover 32 has a mount 33 on the inner side, the carrier plate 25 being fixable to said mount. The mount 33 comprises e.g. clips, latching mounts or plug connections, in particular for releasably securing the carrier plate 25. The cover 32 covers the lighting device 4 like a screen downward toward the vehicle interior. The cover 32 is adhesively bonded for example to the inner surface 15 of the inner pane 8 via an inner limb 34 and to a roof component or roof frame or the like via an outer limb 35.

Figure 11:
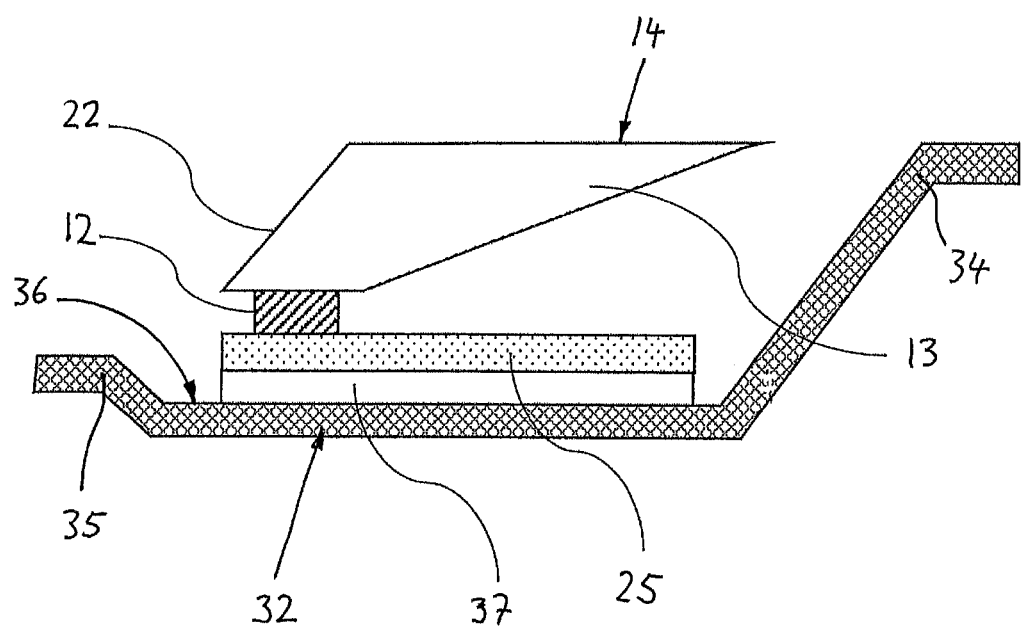
FIG. 11 shows a cross-sectional view of a further embodiment of a mount of the carrier plate which carries the LED light source.

In the case of a further alternative securing, the carrier plate 25 (FIG. 11) is secured to an inner side 36 of the cover 32 by means of an adhesive bond 37 comprising e.g. an adhesive layer or an adhesive tape.

Figure 7:
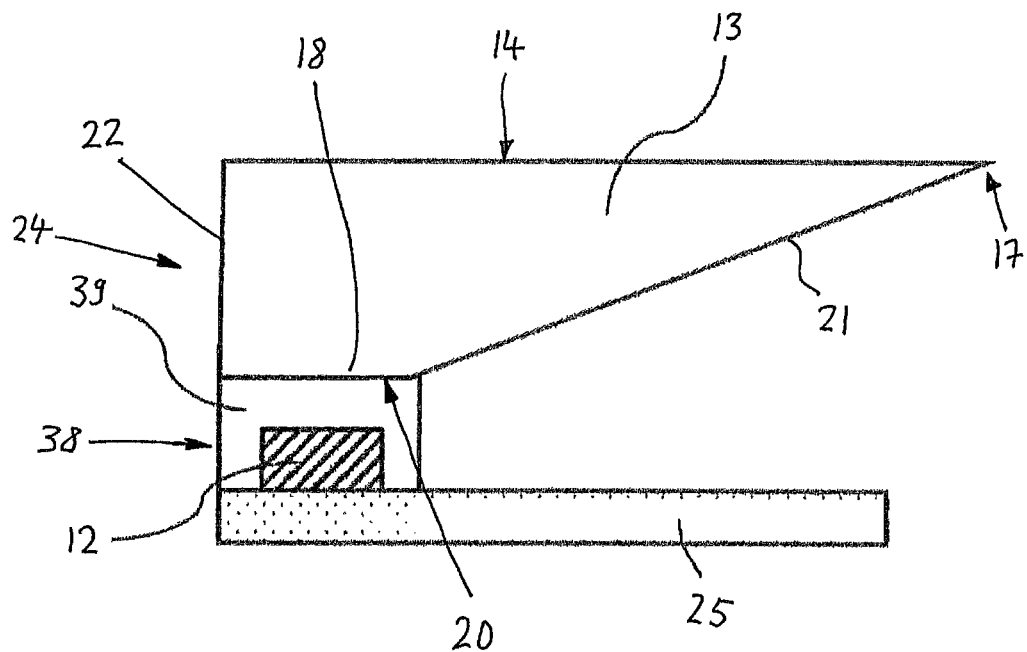
FIG. 7 shows a cross-sectional view of the light incoupling element with an LED light source coupled via a light guide optics unit.

One preferred embodiment provides for (see FIG. 7) the LED 12 to be connected to the light incoupling region 18 via a light guide optics unit 38. The light guide optics unit 38 is arranged as an optics component 39 on the LED 12 and is positioned at the light guide surface 20 by means of the carrier plate 25. The light guide optics unit 38 or the optics component 39 is configured e.g. in such a way that the light emitted by the LED 12 is influenced in a desired manner for entry in the light incoupling region 13, e.g. with regard to the direction or focusing of the light beams. The light guide optics unit 38 or the optics component 39 comprises in particular a TIR (total internal reflection) collimator, which generates a substantially parallel beam path of the light radiation.

Figure 8:
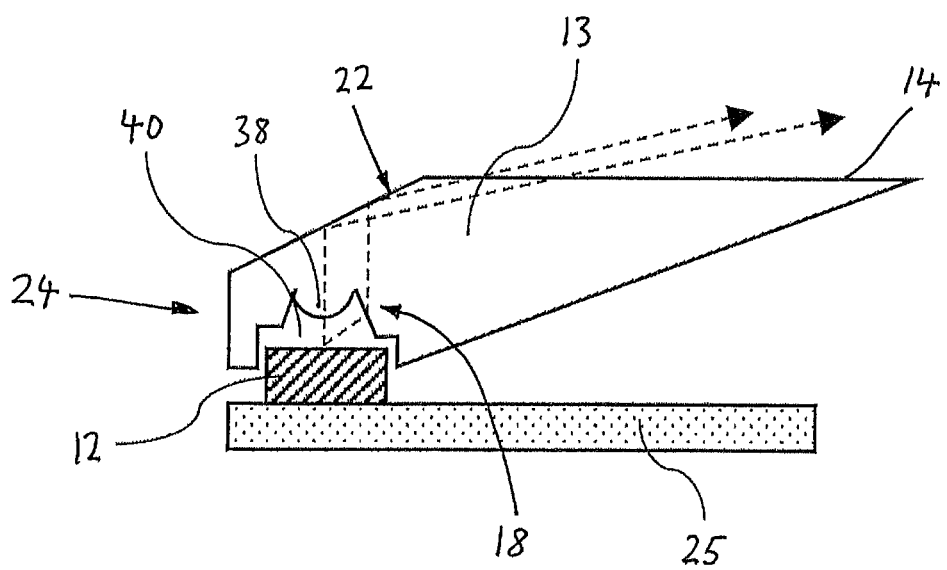
FIG. 8 shows a cross-sectional view of a further embodiment of the light incoupling element with a coupled LED light source.

FIG. 8 shows an alternative configuration of the light incoupling element 13 with a light guide optics unit 38. The light guide optics unit 38 is formed by an optical configuration of the light incoupling region 18 of the light incoupling element 13. FIG. 8 furthermore shows an embodiment in which the light incoupling element 13 has in its light incoupling region 18 a respective depression 40 which is assigned to an LED 12 and in which the light guide optics unit 38 is formed in a position set back into the interior of the light incoupling element 13. The depression 40 is of such a size and has such a, for example round or rectangular, cross section that the LED 12 with its housing can be accommodated therein at least partly in a recessed manner and is oriented in a manner assigned to the light guide optics unit 38. A wall of the depression 40 can be configured in relation to the LED 12 and its housing in such a way that the LED 12 with its housing is kept centered with respect to the light guide optics unit 38. This light guide optics unit 38 formed in the light incoupling element 13 can also be configured as a TIR collimator.

FIGS. 3 to 6A and 6B show light incoupling elements 13 of varying configurations.

The light incoupling element 13 illustrated in FIG. 3 has (in line with FIG. 7) a lateral boundary surface 22 which is oriented perpendicularly to the base surface 14 and forms the entire lateral outer side 24 of the light incoupling element 13. This boundary surface 22 reflects in particular such light from an LED 12 which is emitted by the LED 12 over a large emission angle.

The light incoupling element 13 illustrated in FIG. 4 has a lateral boundary surface 22 in line with the embodiment in FIG. 2. The lateral boundary surface 22 is arranged in a manner inclined at an obtuse internal angle α with respect to the base surface 14. By way of example, the boundary surface 22 is oriented at an obtuse internal angle α in the range of approximately 120° to 140° with respect to the base surface 14.

In the case of the light incoupling elements 13 in FIGS. 3 and 4, the light incoupling surface 20 is arranged or oriented parallel to the base surface 14.

The light incoupling element 13 illustrated in FIG. 6A is a modification of the light incoupling element 13 in FIG. 4 and in contrast thereto has a light incoupling surface 20 which is not arranged parallel to the base surface 14, but rather is inclined in a direction toward the radiation of light into the light guide layer 10. An internal angle β between the light incoupling surface 20 and the wedge reflection surface 21 is smaller than the corresponding internal angle of the embodiment in FIG. 4.

FIG. 6B shows a light incoupling element 13 in accordance with a further modification of the light incoupling element 13 in FIG. 4. The light incoupling element 13 in FIG. 6B has a light incoupling surface 20 which is not arranged parallel to the base surface 14, but rather is inclined in a direction toward the radiation of light into the light guide layer 10. Therefore, in principle, this light incoupling element 13 is similar to that in FIG. 6A. However, further geometric conditions arise in the case of the light incoupling element 13 in FIG. 6B. As is illustrated in FIG. 6B, the light source 11 in the form of the LED 12 is arranged in a specific orientation at the light incoupling surface 20. In the case illustrated, the light source 20 has a light direction axis or light incidence axis a, along which light is principally radiated into the light incoupling element 13 from the light source 11. In this exemplary embodiment, the cross section of the light incoupling element 13 is configured in such a way that the light incidence axis a forms an angle γ with the base surface 14, which angle is in the range of 45° to 135° inclusive, as is illustrated in FIG. 6B. In this case, the light incoupling surface 20 extends substantially perpendicularly to the light incidence axis a and is thus at an acute angle δ in relation to the base surface 14, as likewise illustrated in FIG. 6B.

Preferably, the angle α formed by the lateral boundary surface 22 with respect to the base surface 14 is in the range of 90° to 180° inclusive, with an internal angle β between the light incoupling surface 20 and the wedge reflection surface 21 preferably being in the range of 100° to 150°.

As is furthermore discernible in FIG. 6B, the light incoupling surface 20 at least partially covers the boundary surface 22, i.e. an area of the boundary surface 22 projected in the light incidence axis a overlaps the light incoupling surface 20 or an area of the light incoupling surface 20 projected in the light incidence axis a. In other words, the area of the boundary surface 22 projected in the light incidence axis a lies completely within the area of the light incoupling surface 20 projected in the light incidence axis a.

What is particularly advantageous about the exemplary embodiment in FIG. 6B is that the light from the light source 11 in the form of the LED 12 is radiated into the light incoupling element 13 in the form of a prism in such a way that the light is already guided obliquely in the direction of the light guide layer 10. Light that impinges on the boundary surface 22 is deflected in such a way that either it is incoupled obliquely into the light guide layer 10, or it is incoupled obliquely into the light guide layer 10 via the wedge reflection surface 21 situated opposite the base surface 14 as a rising flank.

A further advantage of the exemplary embodiment in FIG. 6B is that light which, having been reflected by the light guide layer 10, is coupled back into the light incoupling element 13 is reflected in a deflected manner via the wedge reflection surface 21 and is coupled back obliquely into the light guide layer 10. Alternatively, the light coupled back into the light incoupling element 13 is reflected toward the boundary surface 22 via the wedge reflection surface 21 and/or the light incoupling surface 20 and is incoupled into the light guide layer 10 again for the most part. Furthermore, light that does not follow the light incidence axis a and is guided from the LED 12 into the light incoupling element 13 to the boundary surface 22 is reflected in such a way that this light, having been reflected in a deflected manner via the wedge reflection surface 21, is incoupled into the light guide layer 10.

Preferably, the incoupling of light from the light incoupling element 13 in the form of the prism into the light guide layer 10 thus takes place for the most part at an angle in such a way that the light remains in the light guide layer 10 by virtue of total internal reflection. Preferably, the light is in this case outcoupled only at defined outcoupling points on the light guide layer 10.

The light incoupling element 13 illustrated in FIG. 5 has a curved boundary surface 22. The boundary surface 22 curves proceeding from the base surface 14 with a center of curvature situated at the light incoupling element 13 downward as far as the light incoupling surface 20.

Ambient light illumination is provided by the two lighting devices 4, which are arranged symmetrically with respect to a vertical longitudinal central plane of the roof in the region of the respective side edge 6 of the vehicle pane 3.

| List of reference signs | |
|---|---|
| 1 | Vehicle roof |
| 2 | Roof opening |
| 3 | Vehicle pane |
| 4 | Lighting device |
| 5 | Pane inner side |
| 6 | Side edge |
| 7 | Outer pane |
| 8 | Inner pane |
| 9 | Connecting layer |
| 10 | Light guide layer |
| 11 | Light source |
| 12 | LED |
| 13 | Light incoupling element |
| 14 | Base surface |
| 15 | Inner surface |
| 16 | Adhesive bond |
| 17 | Wedge vertex |
| 18 | Light incoupling region |
| 19 | Underside |
| 20 | Light incoupling surface |
| 21 | Wedge reflection surface |
| 22 | Boundary surface |
| 23 | Pane edge |
| 24 | Outer side |
| 25 | Carrier plate |
| 26 | Light beam |
| 27 | Light beam |
| 28 | Mount |
| 29 | Pin |

-continued

List of reference signs

| | |
|---|---|
| 30 | Securing clips |
| 31 | Opening |
| 32 | Cover |
| 33 | Mount |
| 34 | Inner limb |
| 35 | Outer limb |
| 36 | Inner side |
| 37 | Adhesive bond |
| 38 | Light guide optics unit |
| 39 | Optics component |
| 40 | Depression |

The invention claimed is:

1. A vehicle pane having
a light guide layer on the pane inner side and having a lighting device, which introduces light from a light source into the light guide layer by a light incoupling device,
the light incoupling device having at least one light incoupling element which has a base surface and is optically connected, via its base surface, to an inner surface of the light guide layer facing a vehicle interior,
wherein the light incoupling element has a light incoupling region which is situated opposite the base surface and on which is positioned the light source having at least one LED which radiates light into the light incoupling element via the light incoupling region; and
wherein the light incoupling element has on its light incoupling region a plane light incoupling surface which is arranged parallel to the base surface.

2. The vehicle pane as claimed in claim 1, wherein the LED is mounted on a carrier plate which is arranged on the underside of the light incoupling element situated opposite the base surface.

3. The vehicle pane as claimed in claim 2, wherein the light incoupling element has a mount keeping the carrier plate fixed relative to the light incoupling element.

4. The vehicle pane as claimed in claim 2, wherein the carrier plate is attached to a cover which covers the light incoupling element.

5. The vehicle pane as claimed in claim 4, wherein the carrier plate is attached to the cover by a mount or an adhesive bond.

6. The vehicle pane as claimed in claim 2, wherein the carrier plate is a PCB carrier plate, which is arranged on the underside of the light incoupling element situated opposite the base surface.

7. The vehicle pane as claimed in claim 1, wherein the LED is connected to the light incoupling region via a light guide optics unit.

8. The vehicle pane as claimed in claim 7, wherein the light guide optics unit is formed on the light incoupling region of the light incoupling element or is positioned as an optics component between the light incoupling region of the light incoupling element and the LED.

9. The vehicle pane as claimed in claim 8, wherein the light incoupling element has in its light in-coupling region a depression into which the LED or the light guide optics unit is at least partly inserted.

10. The vehicle pane as claimed in claim 8, wherein the light incoupling element has in its light in-coupling region a depression at or in which the light guide optics unit is formed in a manner set back into the interior of the light incoupling element.

11. The vehicle pane as claimed in claim 7, wherein the light guide optics unit comprises a total internal reflection collimator.

12. The vehicle pane as claimed in claim 1, wherein the light incoupling element has a lateral boundary surface which is directed to an adjacent pane edge and at which light radiated into the light incoupling element is reflected by total internal reflection in the direction of the light guide layer.

13. The vehicle pane as claimed in claim 12, wherein the boundary surface is formed as a planar reflection surface and is oriented perpendicularly to the base surface or at an internal angle of greater than 90° with respect to the base sur-face, or in that the boundary surface is formed as a curved reflection surface or has at least one curved portion.

14. The vehicle pane as claimed in claim 12, wherein the boundary surface has a reflective surface or coating.

15. The vehicle pane as claimed in claim 1, wherein the light incoupling element, via its base surface, is formed in one piece with the light guide layer.

16. The vehicle pane as claimed in claim 1, wherein the at least one LED is a top LED.

17. A vehicle pane having
a light guide layer on the pane inner side and having a lighting device, which introduces light from a light source into the light guide layer by a light incoupling device,
the light incoupling device having at least one light incoupling element which has a base surface and is optically connected, via its base surface, to an inner surface of the light guide layer facing a vehicle interior,
wherein the light incoupling element has a light incoupling region which is situated opposite the base surface and on which is positioned the light source having at least one LED which radiates light into the light incoupling element via the light incoupling region,
wherein the LED is mounted on a carrier plate which is arranged on the underside of the light incoupling element situated opposite the base surface,
wherein the light incoupling element has a mount keeping the carrier plate fixed relative to the light incoupling element, and
wherein the mount has at least two pins which are arranged at the light incoupling element inward from the LEDs and in each case offset with respect to the LEDs and which engage by way of a respective securing clip in assigned openings in the carrier plate.

* * * * *